United States Patent
Wang

(10) Patent No.: US 11,061,271 B1
(45) Date of Patent: Jul. 13, 2021

(54) POLARIZING DEVICE AND PREPARATION METHOD THEREOF, DISPLAY PANEL, AND DISPLAY DEVICE

(71) Applicant: TCL CHINA STAR OPTOELECTRONICS TECHNOLOGY CO., LTD., Guangdong (CN)

(72) Inventor: Haijun Wang, Guangdong (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 16/627,854

(22) PCT Filed: Dec. 27, 2019

(86) PCT No.: PCT/CN2019/129054
§ 371 (c)(1),
(2) Date: Dec. 31, 2019

(51) Int. Cl.
*G02F 1/1335* (2006.01)
(52) U.S. Cl.
CPC .... *G02F 1/133528* (2013.01); *C09K 2323/00* (2020.08); *C09K 2323/031* (2020.08); *G02F 2201/50* (2013.01); *G02F 2202/28* (2013.01)
(58) Field of Classification Search
CPC ......... G02F 1/133528; G02F 1/133502; G02F 1/133504; G02F 2201/50; G02F 2202/28; G02F 2203/03; C09K 2323/00; C09K 2323/03; C09K 2323/031
USPC .... 428/21.1, 1.3, 1.31, 33, 1.1; 349/96, 112, 349/138, 158
See application file for complete search history.

(56) References Cited

U.S. PATENT DOCUMENTS

| | | | |
|---|---|---|---|
| 2001/0008437 A1* | 7/2001 | Fujimori | G02F 1/133555 349/113 |
| 2008/0213513 A1* | 9/2008 | Kameshima | G02F 1/133502 428/1.32 |
| 2014/0132894 A1 | 5/2014 | Lee et al. | |
| 2016/0004121 A1 | 1/2016 | Inomata | |
| 2016/0048057 A1 | 2/2016 | Sekiguchi et al. | |
| 2018/0156944 A1 | 6/2018 | Hu | |

FOREIGN PATENT DOCUMENTS

| | | |
|---|---|---|
| CN | 103810946 A | 5/2014 |
| CN | 105093381 A | 11/2015 |
| CN | 105209968 A | 12/2015 |
| CN | 105278147 A | 1/2016 |
| CN | 108002426 A | 5/2018 |
| CN | 109765729 A | 5/2019 |
| JP | 2005338815 A | 12/2005 |

\* cited by examiner

*Primary Examiner* — Ruiyun Zhang
(74) *Attorney, Agent, or Firm* — Mark M. Friedman

(57) ABSTRACT

The present invention discloses a polarizing device, a preparation method thereof, a display panel, and a display device. The polarizing device includes: a polarizing functional layer; and an auxiliary functional layer disposed on the polarizing functional layer, wherein the auxiliary functional layer includes a host material and an additive, a thermal expansion coefficient of the additive is less than that of the host material, and a thermal conductivity of the additive is greater than that of the host material. In the above way, the present invention can improve stress bending of the polarizing device in a severe environment such as high temperature and high humidity, and improve quality and reliability of product.

3 Claims, 3 Drawing Sheets

POLARIZING DEVICE AND PREPARATION METHOD THEREOF, DISPLAY PANEL, AND DISPLAY DEVICE

FIELD OF INVENTION

The present invention relates to the technical field of polarizing devices, and in particular, to a polarizing device and a preparing method thereof, a display panel, and a display device.

BACKGROUND OF INVENTION

With continuous development of display technology, people's demand on performance of display panels is increasingly higher. Especially in outdoor or harsh environments such as high temperature and high humidity, people still expect display panels to have stable display performance and long service life.

TECHNICAL PROBLEM

As an important component of liquid crystal displays to achieve optical conversion, polarizers play a critical role in optical performance of the displays. In the prior art, when the liquid crystal displays are used outdoors, outdoor temperature and humidity conditions are sometimes extremely harsh. In a condition of high temperature and high humidity, the polarizers generate internal stress and then bend because of water absorption and temperature. In a condition that the polarizers bend due to stress, tensile stress between upper and lower substrates of the liquid crystal displays may increase, which may cause the upper and lower substrates of the liquid crystal displays to separate, which seriously affects the reliability of the product quality.

Therefore, the prior art needs to be further improved.

SUMMARY OF INVENTION

The present invention provides a polarizing device and a preparation method thereof, a display panel, and a display device to solve the technical problem that the current polarizing device is prone to bend due to stress in harsh environments such as high temperature and high humidity.

To solve the above technical problem, a technical solution adopted by the present invention is to provide a polarizing device. The device includes:

a polarizing functional layer; and an auxiliary functional layer disposed on the polarizing functional layer; wherein the auxiliary functional layer includes a host material and an additive, a thermal expansion coefficient of the additive is less than a thermal expansion coefficient of the host material, and a thermal conductivity of the additive is greater than a thermal conductivity of the host material.

Wherein the additive includes at least one of the silicon dioxide microsphere, zinc sulfide microsphere, and modified zinc sulfide microsphere.

Wherein a mass fraction of the additive in the auxiliary functional layer ranges from 1% to 40%.

Wherein a diameter of the silicon dioxide microsphere ranges from 10 nm to 5 μm.

Wherein the modified zinc sulfide microsphere is surface-modified zinc sulfide microsphere, and a surface of the modified zinc sulfide microsphere has a hydrophilic functional group.

Wherein the hydrophilic functional group includes at least one of a hydroxyl group and a carboxyl group.

Wherein the auxiliary functional layer includes: a first protective layer and a second protective layer respectively disposed on opposite surfaces of the polarizing functional layer; a surface protective layer disposed on the first protective layer; a separation film layer disposed on the second protective layer; and an adhesive layer disposed at least between the separation film layer and the second protective layer.

To solve the above technical problem, a technical solution adopted by the present invention is to provide a display panel. The display panel includes: an array substrate; a color filter substrate disposed opposite to the array substrate; and a liquid crystal layer disposed between the array substrate and the color filter substrate; wherein the array substrate and/or the color filter substrate includes any of the polarizing devices.

To solve the above technical problem, a technical solution adopted by the present invention is to provide a display device. The display device includes the display panel.

To solve the above technical problem, a technical solution adopted by the present invention is to provide a method for preparing a polarizing device. The method includes: providing a host material for preparing an auxiliary functional layer; adding an additive to the host material and obtaining a raw material for preparing the auxiliary functional layer after stirring; stretch forming the raw material into a film at a certain temperature to obtain the auxiliary functional layer; providing the auxiliary functional layer on the polarizing functional layer to obtain the polarizing device; wherein the auxiliary functional layer includes a host material and an additive, a thermal expansion coefficient of the additive is less than a thermal expansion coefficient of the host material, and a thermal conductivity of the additive is greater than a thermal conductivity of the host material.

BENEFICIAL EFFECT

The beneficial effects of the application are:

The present invention differs from the prior art in that it adds an additive having a thermal expansion coefficient less than that of the host material and a thermal conductivity greater than that of the host material to the auxiliary functional layer constituting the polarizing device, such that the thermal expansion coefficient of the auxiliary functional layer is reduced and the thermal conductivity is enhanced. Therefore, in a harsh environment such as high temperature and high humidity, the auxiliary functional layer is less prone to bend due to stress, and thereby the reliability of the polarizing device is improved.

DETAILED DESCRIPTION OF PREFERRED EMBODIMENTS

Figure 1:
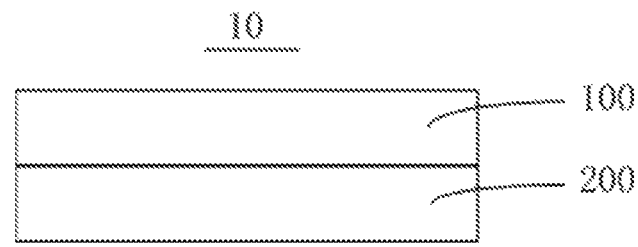
FIG. 1 is a schematic structural diagram of a polarizing device according to a first embodiment of the present invention.

The technical solutions in the embodiments of the present invention will be clearly and completely described below with reference to the drawings in the embodiments of the present invention. Obviously, the described embodiments are only a part of the embodiments of the present invention, but not all the embodiments. Based on the embodiments of the present invention, all other embodiments obtained by a person ordinary skilled in the art without creative efforts shall fall within the protection scope of the present invention.

It should be noted that all directional indications (such as above, below, left, right, front, back . . . ) in the embodiments of the present invention are only used to explain the relative positional relationship and movement of various components in a certain posture (as shown in the drawing). If the specific posture changes, the directional indication also changes accordingly.

In addition, the descriptions related to "first", "second", etc. in the present invention are only for descriptive purposes, and cannot be understood as indicating or implying their relative importance or implicitly indicating the number of technical features indicated. Thus, the features defined as "first" and "second" may explicitly or implicitly include at least one of the features. Moreover, the technical solutions between the various embodiments can be combined with each other but must be based on that can be implemented by those skilled in the art. When the combination of technical solutions conflicts or cannot be achieved, it should be considered that such a combination of technical solutions does not exist and is not within the protection scope claimed by the present invention.

Figure 2:
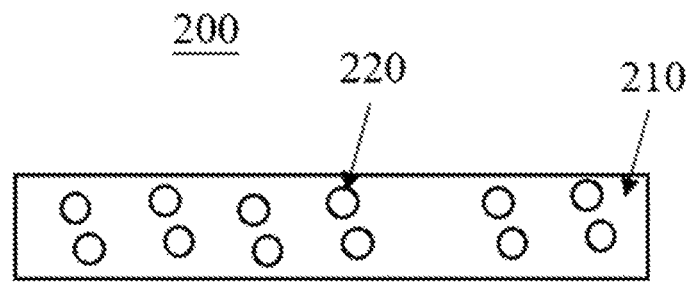
FIG. 2 is a schematic structural diagram of an embodiment of the auxiliary functional layer described in FIG. 1.

Please refer to FIG. 1 and FIG. 2. FIG. 1 is a schematic structural diagram of a polarizing device according to a first embodiment of the present invention. FIG. 2 is a schematic structural diagram of an embodiment of the auxiliary functional layer 200 described in FIG. 1. The polarizing device 10 includes a polarizing functional layer 100 and an auxiliary functional layer 200 disposed on the polarizing functional layer 100, wherein the auxiliary functional layer 200 includes a host material 210 and an additive 220, a thermal expansion coefficient of the additive 220 is less than that of the host material 210, and a thermal conductivity of the additive 220 is greater than that of the host material 210.

In the present embodiment, the auxiliary functional layer 200 constituting the polarizing device 10 is added with the additive 220 whose thermal expansion coefficient is less than that of the host material 210 and whose thermal conductivity is greater than that of the host material 210, such that the thermal expansion coefficient of the auxiliary functional layer 200 is reduced and the thermal conductivity is enhanced. Therefore, in a harsh environment, the auxiliary functional layer 200 is less prone to bend due to stress, and thereby the reliability of the polarizing device 10 is improved.

Further, since the above additive is added to the auxiliary functional layer, it is not necessary to improve the bending stress resistance of the polarizing device by a conventional thickening method, which is beneficial for reducing the manufacturing cost of the polarizing device.

Specifically, the polarizing functional layer 100 is also called a polarizer. It can perform the function of "selectively absorbing light of a certain polarization direction" together with iodine molecules. Materials that can be selected for the polarizer generally include polyvinyl alcohol. Further, the auxiliary functional layer 200 includes, but is not limited to, a protective layer, an adhesive, a release film, and the like, wherein the protective layer protects the pressure-sensitive adhesive and is used to bond the polarizer to the position to be mounted, and the material thereof may generally be a polypropylene adhesive. The protective layer is mainly used to isolate water vapor and is used to protect the polarizing functional layer 100. A commonly used material thereof includes cellulose triacetate. The separation film layer is used for protecting the polarizing functional layer 100. When performing polarizer bonding, it is necessary to remove the separation film layer and then bond the polarizing device 10 to the position to be mounted. A material of the separation film layer is basically the same as that of the protective layer, but usually also includes some silicon-containing materials. The positions to be mounted are different according to different application scenarios and are not specifically limited herein. When the polarizing device 10 is used for a display device, the position to be mounted includes a substrate, and further, it may be a surface of a glass substrate.

Figure 3:
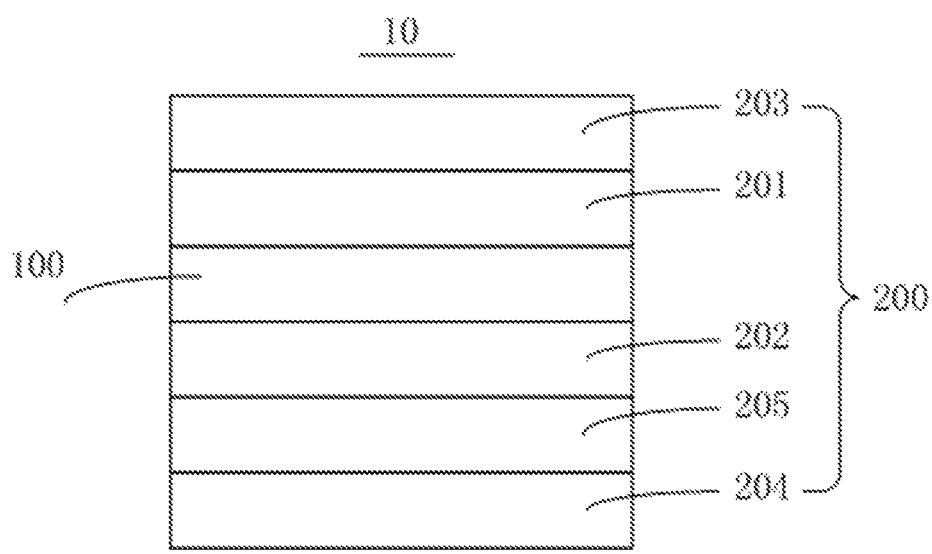
FIG. 3 is a schematic structural diagram of a polarizing device according to a second embodiment of the present invention.

In another embodiment, please refer to FIG. 3, which is a schematic structural diagram of a polarizing device according to a second embodiment of the present invention. The auxiliary functional layer 200 includes: a first protective layer 201 and a second protective layer 202 respectively disposed on opposite surfaces of the polarizing functional layer 100, wherein the first protective layer 201 and the second protective layer 202 are used to protect the polarizing functional layer 100 from erosion by water vapor. A surface protective layer 203 is disposed on the first protective layer 201, wherein a side where the surface protective layer is located is usually more closely in contact with the environment. Providing the surface protective layer 203 on the first protective layer 201 can better protect the polarizing functional layer 100, thereby improving the service life of the polarizing device 10. The separation film layer 204 is disposed on the second protective layer 202; the adhesive layer 205 is disposed at least between the separation film layer 204 and the second protective layer 202. When performing polarizer bonding, the separation film 204 is peeled off, and the polarizing device 10 is bonded to the position to be mounted by the adhesive layer 205 provided between the separation film layer 204 and the second protective layer 202.

It is worth noting that the additive can be added to at least one of the first protective layer 201, the second protective layer 202, the surface protective layer 203, the separation film layer 204, or the adhesive layer 205. It can reduce the thermal expansion coefficient of the auxiliary functional layer 200 and improve its thermal conductivity, which is beneficial to improve the quality and reliability of the polarizing device 10. Further, the first protective layer 201, the second protective layer 202, the surface protective layer 203, the separation film layer 204, and the adhesive layer 205 all contain the additive, which can more effectively prevent the polarizing device 10 from bending due to stress in harsh environments such as high temperature and high humidity, which is beneficial to extend service life.

Table 1 shows a comparison of properties of components in the polarizing device of the present invention.

TABLE 1

|  | PE | PET | PSA | TAC | SiO2 | ZnS | m-ZnS |
|---|---|---|---|---|---|---|---|
| thermal expansion coefficient (ppm/K) | 19.5 | 60 | 45 | 18 | 0.55 | 6.36 | 6.36 |
| thermal conductivity (W/m * K) | 0.3 | 0.2 | 0.4 | 0.2 | 1.5 | 25.1 | 25.1 |

Wherein, m-ZnS represents modified zinc sulfide; PE/PET represents surface protective layer material, TAC represents protective layer material, and PSA represents adhesive layer material.

Further, please refer to Table 1. Table 1 is the comparison table of properties of components in the polarizing device of the present invention. It can be seen that the thermal expansion coefficients of silicon dioxide microsphere, zinc sulfide microsphere, and a modified zinc sulfide microsphere are less than those of the protective layer, the surface protective layer, the separation film layer, and the adhesive layer; meanwhile, their thermal conductivities are significantly greater than those of the protective layer, the surface protective layer, the separation film layer, and the adhesive layer. Therefore, the additive includes at least one of silicon dioxide microsphere, zinc sulfide microsphere, or modified zinc sulfide microsphere, which can reduce the thermal expansion coefficient of the auxiliary functional layer and improve its thermal conductivity. Of course, as long as the additive has a thermal expansion coefficient less than that of the corresponding host material in the auxiliary functional layer and has better thermal conductivity than that of the host material, the above-mentioned effect can be achieved. When the auxiliary functional layer includes a plurality of film layers, the host material of each film layer may be the same or different and the types of corresponding additives may be the same or different as long as the stress bending of the polarizing device can be reduced. It is not specifically limited herein.

Further, in the auxiliary functional layer, a mass fraction of the additive ranges from 1% to 40%, for example, 1%, 5%, 10%, 20%, or 40%. The specific amount of the additive is closely related to the type of additive and the performance requirements of the product, so it is not specifically limited here.

Further, when the additive is silicon dioxide microsphere, a diameter of the silicon dioxide microsphere ranges from 10 nm to 5 μm, such as 10 nm, 100 nm, 1 μm, 3 μm, or 5 μm, or the like.

Furthermore, when the additive is modified zinc sulfide microsphere, the modified zinc sulfide microsphere is surface-modified zinc sulfide microsphere, and a surface of the modified zinc sulfide microsphere has a hydrophilic functional group. The hydrophilic functional group enables the modified zinc sulfide microsphere additive to be better mixed with the host material to more uniformly disperse in the auxiliary functional layer, thereby reducing the stress bending risk of the device. Further, the hydrophilic functional group includes at least one of a hydroxyl group or a carboxyl group. Of course, the hydrophilic functional group can be selected according to the actual needs of users and is not limited here.

To solve the above technical problem, a technical solution adopted by the present invention is to provide a display panel.

Figure 4:
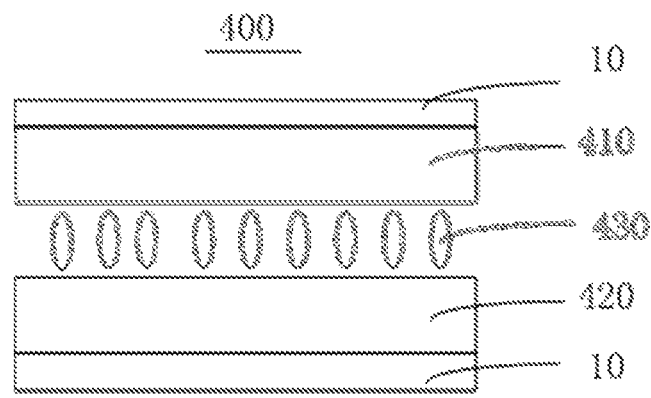
FIG. 4 is a schematic structural diagram of a display panel according to the first embodiment of the present invention.

To solve the above technical problem, a technical solution adopted by the present invention is to provide a display panel. Please refer to FIG. 4, which is a schematic structural diagram of a display panel according to a first embodiment of the present invention. The display panel 400 includes: an array substrate 410; a color filter substrate 420 disposed opposite to the array substrate 410; and a liquid crystal layer 430 disposed between the array substrate 410 and the color filter substrate 420; wherein the array substrate 410 and/or the color filter substrate 420 includes any of the polarizing device 10.

In the present embodiment, a polarizing device 10 in the display panel 400 has better stress bending resistance. It has a better tolerance to harsh environments such as high temperature and high humidity, which is beneficial to the further promotion and application of the display panel 400.

Figure 5:
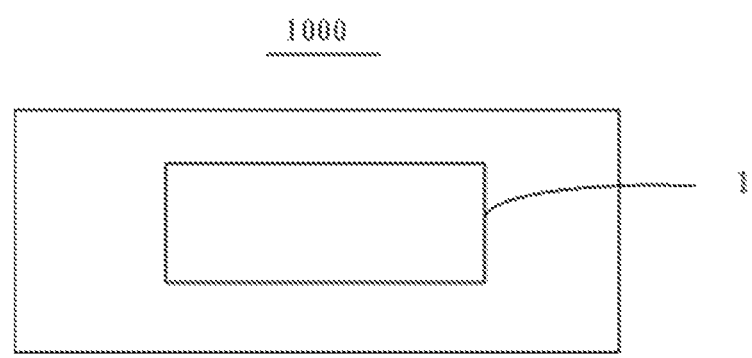
FIG. 5 is a schematic structural diagram of a display device according to the first embodiment of the present invention.

To solve the above technical problem, a technical solution adopted by the present invention is to provide a display device. Please refer to FIG. 5, which is a schematic structural diagram of a display device according to the first embodiment of the present invention. The display device 1000 includes the display panel 400.

The display device 1000 includes a fixed display device and a mobile display device. The fixed display device includes, but is not limited to, a television, a desktop monitor, etc., especially a fixed display device of a large size (greater than 65 inches), and especially a display device applied in a harsh environment such as high temperature and humidity outdoors. The mobile display device includes, but is not limited to, a mobile phone, a tablet computer, a smartwatch, VR glasses, and the like.

Figure 6:
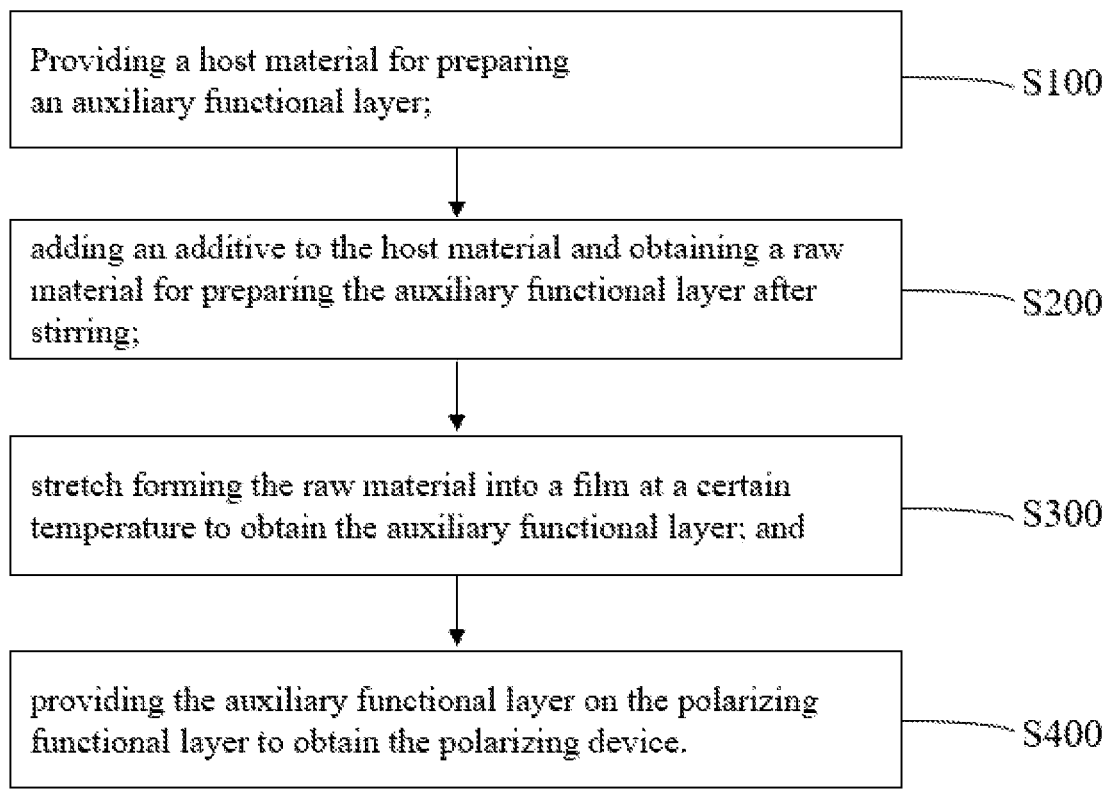
FIG. 6 is a schematic flowchart of a method for preparing a polarizing device according to the first embodiment of the present invention.

To solve the above technical problem, a technical solution adopted by the present invention is to provide a method for preparing a polarizing device. Please refer to FIG. 6, which is a schematic flowchart of a method for preparing a polarizing device according to the first embodiment of the present invention, wherein the method includes steps of:

S100, a host material is provided for preparing an auxiliary functional layers. In the step S100, the auxiliary functional layer may include multiple film layers, such as a protective layer, a surface protective layer, a separation film layer, an adhesive layer, and the like. Correspondingly, the host material of each film layer may be the same or different.

S200, an additive is added to the host material, and the raw materials for preparing the auxiliary functional layer are obtained after stirring.

In the step S200, the additive is added to the host material of at least one film layer of the auxiliary function layer. Of course, in order to obtain better resistance to stress bending, the additive may be added in multiple or all film layers, the types of additive added to different film layers may be the same or different, as long as the stress bending of the polarizing device can be reduced, which is not specifically limited herein.

Specifically, the stirring speed may be related to the properties of the types of the host material and the additive corresponding to the film layer, and is not specifically limited herein.

S300, stretch forming the raw material into a film at a certain temperature to obtain the auxiliary functional layer. In the step S300, the temperature for stretch forming the raw material into a film may be related to the nature of the raw material. For different raw materials, the selected temperature is different, so it is not specifically limited herein.

After being stretched and formed into a film, a composite film with good resistance to stress bending can be obtained, such as a $SiO_2$/PE composite film or a ZnS/PE composite film.

S400, the polarizing device is obtained by providing the auxiliary functional layer on the polarizing functional layer; wherein the auxiliary functional layer includes a host material and an additive, and a thermal expansion coefficient of the additive is less than a thermal expansion coefficient of the host material, and a thermal conductivity of the additive is greater than a thermal conductivity of the host material. In the step S400, the prepared auxiliary functional layer needs to be disposed on the polarizing functional layer to obtain the polarizing device; specifically, the auxiliary functional layer may be fixedly disposed on the polarizing functional layer by bonding.

The technical details and technical benefits related to the polarizing device have been described in detail in the foregoing, so they are not repeated here.

In summary, the present invention adds an additive having a thermal expansion coefficient less than that of the host material and a thermal conductivity greater than that of the host material to the auxiliary functional layer constituting the polarizing device, such that the thermal expansion coefficient of the auxiliary functional layer is reduced and the thermal conductivity is enhanced. Therefore, in a harsh environment such as high temperature and high humidity, the auxiliary functional layer is less prone to bend due to stress, and thereby the reliability of the polarizing device is improved.

The above description is only embodiments of the present invention and does not limit the scope of the present invention. Any equivalent structure or equivalent process transformation made by using the description and drawings of the present invention, or directly or indirectly used in other related technical fields, is also included in the scope of the present invention.

What is claimed is:

1. A polarizing device, comprising:
a polarizing functional layer; and
an auxiliary functional layer disposed on the polarizing functional layer, wherein the auxiliary functional layer comprises a host material and an additive, a thermal expansion coefficient of the additive is less than a thermal expansion coefficient of the host material, and a thermal conductivity of the additive is greater than a thermal conductivity of the host material; and
wherein the additive comprises a surface-modified zinc sulfide microsphere, a surface of the surface-modified zinc sulfide microsphere has a hydrophilic functional group, and the hydrophilic functional group comprises at least one of a hydroxyl group or a carboxyl group.

2. The polarizing device according to claim 1, wherein a mass fraction of the additive in the auxiliary functional layer ranges from 1% to 40%.

3. The polarizing device according to claim 1, further comprising:
a first protective layer and a second protective layer respectively disposed on opposite surfaces of the polarizing functional layer;
a surface protective layer disposed on the first protective layer;
a separation film layer disposed on the second protective layer; and
an adhesive layer disposed at least between the separation film layer and the second protective layer;
wherein the auxiliary functional layer is one of the first protective layer, the second protective layer, the surface protective layer, the separation film layer, or the adhesive layer.

* * * * *